United States Patent [19]

Keller

[11] 4,338,917
[45] Jul. 13, 1982

[54] LOW TEMPERATURE SOLAR FURNACE AND METHOD

[75] Inventor: Robert R. Keller, Bedford, N.H.

[73] Assignee: Keller Companies, Inc., Manchester, N.H.

[21] Appl. No.: 295,377

[22] Filed: Aug. 24, 1981

Related U.S. Application Data

[63] Continuation of Ser. No. 49,736, Jun. 18, 1979, abandoned, which is a continuation-in-part of Ser. No. 949,267, Oct. 6, 1978, abandoned, which is a continuation of Ser. No. 579,560, May 21, 1975, abandoned.

[51] Int. Cl.$^3$ .............................................. F24J 3/02
[52] U.S. Cl. .................................. 126/429; 126/436; 126/437; 126/450
[58] Field of Search ............... 126/429, 436, 437, 430, 126/442, 450, 417, 400, 427, 438

[56] References Cited

U.S. PATENT DOCUMENTS

| | | | |
|---|---|---|---|
| 748,696 | 1/1904 | Browing | 126/438 |
| 2,311,579 | 2/1943 | Scott | 126/427 |
| 2,595,905 | 5/1962 | Telkes | 126/419 |
| 2,677,367 | 5/1954 | Telkes | 126/437 |
| 3,006,818 | 10/1961 | Lappala | 126/450 |
| 3,277,883 | 10/1966 | Rowekamp | 126/450 |
| 3,277,884 | 10/1966 | Rowekamp | 126/432 |
| 3,314,414 | 4/1967 | Rowekamp | 126/450 |
| 3,314,415 | 4/1967 | Rowekamp | 126/450 |
| 3,390,672 | 7/1968 | Snelling | 126/433 |
| 3,450,192 | 6/1969 | Hay | 126/452 |
| 3,563,305 | 2/1971 | Hay | 126/436 |
| 3,832,992 | 9/1974 | Trombe et al. | 126/429 |
| 3,875,925 | 4/1975 | Johnston | 126/429 |
| 3,894,685 | 7/1975 | Keyes et al. | 126/429 |
| 3,903,665 | 9/1975 | Harrison | 52/171 |
| 3,946,721 | 3/1976 | Keyes et al. | 126/436 |
| 3,952,947 | 4/1976 | Saunders | 126/429 |
| 3,955,555 | 5/1976 | Bostrom | 126/429 |
| 3,971,359 | 7/1976 | Bourne | 126/429 |
| 4,139,055 | 2/1979 | Thomason | 126/437 |

*Primary Examiner*—Daniel J. O'Connor
*Attorney, Agent, or Firm*—Rines and Rines, Shapiro & Shapiro

[57] ABSTRACT

This disclosure generally relates to a technique and apparatus for solar heating which may be adapted for heating residential, commercial or industrial buildings, and in which the functions of solar energy collection, storage and heat-exchange are combined in the same passive structure generally consisting of a plurality of cylindrical tubes preferably fabricated of glass-fiber reinforced polyester resin which are filled with a stationary heat absorbing medium, such as water, with their surfaces preferably coated with a high absorptance material on to which solar rays are directed through a solar "transmittor" or window, and which surfaces serve as heat-exchange elements from which heat may be extracted in a variety of ways, including passage of air and thermal siphoning, and with the tubes enclosed within an appropriate insulated chamber. Cooperative action with domestic or similar hot water systems may also be achieved.

15 Claims, 13 Drawing Figures

LOW TEMPERATURE SOLAR FURNACE AND METHOD

The present invention relates generally to a low temperature solar furnace and the like, being more particularly directed to a method of and apparatus for collecting and storing solar energy and selectively releasing this energy in a controlled manner with a unitary passive system suitable for residential, commercial, industrial, and other related space heating purposes; this application being a continuation application of U.S. patent application Ser. No. 49,736, filed June 18, 1979, now abandoned, which is a continuation-in-part of U.S. patent application Ser. No. 949,267, filed Oct. 6, 1978 now abandoned, and which, in turn is a continuation of patent application Ser. No. 579,560, filed May 21, 1975, now abandoned.

Though, as explained in said earlier applications, the prior art discloses a variety of solar systems which represent valuable and well recognized concepts for providing heat, these systems suffer from a number of deficiencies. For example, most of these heating systems consist of an arrangement of "collectors" which are connected by piping or duct-work to a remotely heated reservoir or storage chamber filled with rocks, water, or the like, accordingly requiring some configuration for the distribution of the absorbed heat energy to the reservoir or storage chamber being heated. Systems requiring such pumping or the like are "active" systems generally comprised of separate and independent components that obviously require pressurization and/or moving parts, and tend to be expensive, inefficient, and demanding of substantial installation space. Further, many such systems using water have been subject to corrosion and freezing.

Illustrations of active system approaches, including with the aid or reflecting surfaces, are described, for example, in U.S. Pat. Nos. (cite those of record in previous Keller applications), 1,853,480; 1,888,620; 3,841,302; 3,989,032; 3,946,944; 3,973,553; 3,987,786; 4,002,160; 4,026,269; 4,055,163; 4,082,143; 4,111,359; 4,112,920; 4,112,922; German Pat. Nos. 24 41 151, 25 11 740; and French Pat. Nos. 2,267,531 and 2,299,604.

Many of such proposals involved separate locations for solar collection and storage, with the necessity for fluid movement under power therebetween; and others also require remote storage and/or powered fluid movement or the like and/or powered fluid extraction from storage, with none providing an integrated system wherein collection, absorption, storage and provision of direct heat-exchange surfaces are provided in a passive singly unitary structure.

More recent concepts for the use of solar roof-mounted or attic systems also consistently involve at least active systems, in whole or in part, such as are described in Popular-Science, January, 1979, "Solar Attic House", pp. 68–71, 146; U.S. Department of Agriculture Misc. Publication No. 1367, March 1978; and in "Workshop on Energy Alternatives: The Goosebrook Solar Home", Total Environmental Action, Inc., Harrisville, N.H., June 19, 1977.

The present invention hereinafter described, on the other hand, as described in said earlier applications, vastly improves upon prior art techniques by providing an integrated passive arrangement of components within a unitary physical configuration which functions simultaneously in three modes; namely, (1) as a heat sink during a period of solar energy absorption; (2) as a storage medium at the same location of the solar heat collected; and (3) as a heat source or heat exchange surface at the same location during a period of energy extraction. None of these operating modes, however, requires any moving parts or internal or bulk movement of the fluid or the like, thus achieving a high degree of efficiency at reasonable cost and minimum space requirements. In its broad form, this invention envisions an insulated chamber or enclosure having one of its sides comprising preferably a multiple-layer-glazed, insulated solar window which functions as a selective solar energy transmitting medium, and may accordingly be referred to as a "transmittor". Interiorly of this insulated chamber and coextensively juxtaposed the solar window or transmittor are a plurality of heat sinks for absorbing and storing the heat energy transmitted through the "window".

Operable means are employed in this invention selectively to change the character of the solar window from a solar energy transmittor and therefore moderately heat insulating, to being almost totally energy opaque. The solar window, when energy opaque, is therefore "super-insulated". Alternatively, another arrangement will hereinafter be described whereby a separate insulating means in the nature of a curtain may be selectively interposed between the solar window and the heat sink means, whereby to prevent any undesired heat transfer through the solar window from the interior of the insulated chamber.

Accordingly, it is among the various objects of this invention to provide a unitary and integral solar structure which performs three basic functions and does so passively; namely, absorbs solar energy, stores the absorbed energy, and releases this stored energy when needed, all at the same fixed location.

It is a further object of this invention to provide a solar device with a solar window and means for regulating the amount of heat energy permitted to pass through such a solar window.

It is another and further object of this invention to provide a method and apparatus whereby a unitary and integral solar sturcture may function in multi-operational modes as a solar energy transmittor, solar energy collector, a heat sink, and heat exchanger with no moving parts.

It is yet a further object of this invention to provide a solar heating structure which will constitute an aesthetic component of a residential home or other building.

A further feature of this invention, is that because of its unusual design, no separate heat storage structure is required, hence, no heat losses will be incurred due to transmission of heat energy to such separate storage areas.

Still an additional object is to provide a novel passive solar attic system (with the term "attic" being used herein generically to embrace roof, dormer or similar roof-like spaces as well as conventional attic spaces).

Another object resides in a new and improved combination of passive solar attic system and supplemental wall solar furnaces for special room supplemental heating.

An additional object is to provide a novel combined passive attic solar system and the like with a domestic or similar hot water heating system.

These and other objects and features of the invention will be more clearly understood from the following description taken in conjunction with the drawings and are more particularly pointed out in the appended claims. In the drawings.

Figure 1:
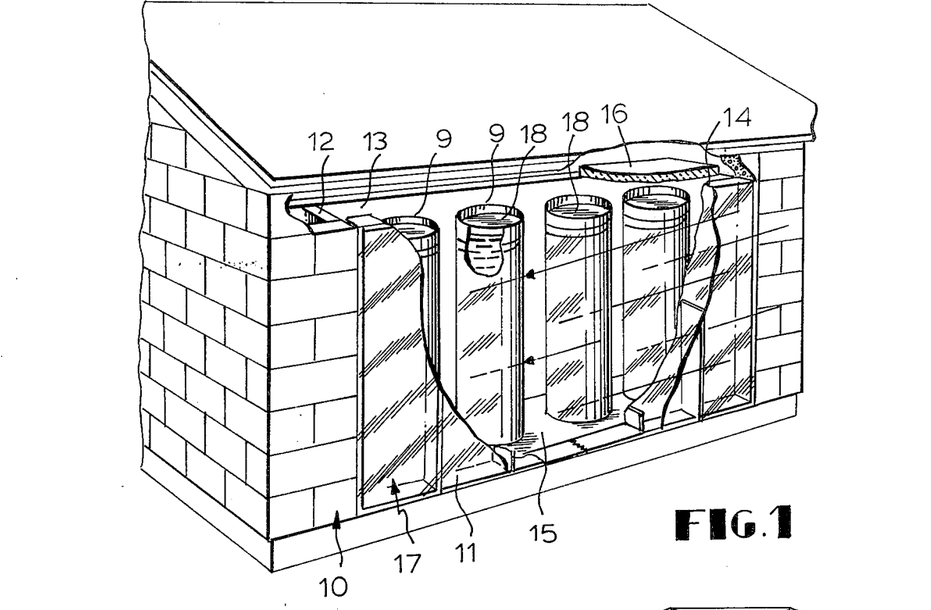
FIG. 1 is a perspective sectioned view of a typical building utilizing an apparatus constructed in accordance with this invention.

Referring now with greater particularity to the drawings, FIG. 1 represents a broken view of a wall portion of a typical building wherein a portion of a southerly facing exterior wall 10 is comprised of one or more solar windows or transmittor panels 11. In the disclosed embodiment, such solar transmitting panels consist of a rectangular frame with a series of vertically spaced-apart grid elements carrying translucent glass fiber reinforced polyester sheet material bonded to the opposed surfaces thereof. Obviously other translucent or transparent facing materials may be employed.

Vertical wall portions 12,13, and 14 are insulated, as are floor portions 15 and ceiling portion 16, thus forming, in conjunction with exterior wall panel 11, an insulated chamber or cocoon typically represented as 17. Preferably, all interior surfaces, with the exception of the solar windows 11, are coated or otherwise covered with a reflective material.

Located interiorly of chamber 17 are a plurality of water-filled, translucent, glass-fiber reinforced cylinders or tubes 18 which preferably have a portion 9 of the cylinder wall coated or otherwise colored dark so as to act as a heat absorber. Though other tube shapes may be employed, the preferred configuration is cylindrical because of its superior structural qualities.

Tubes 18 are intended to function in any of three modes; namely, (1) as a heat sink during the heat absorbing phase; (2) as a heat storage unit following the absorbing phase; and (3) as a heat source during the heat extraction phase. Each of these modes will be explained hereinafter in greater detail.

This multi-mode characteristic of operation in a unitary passive structure is one of the several important features of this invention. By way of conceptual explanation, a "collector" refers, in the state of the art, to a device that performs both the functions of the solar transmittor and the heat absorber, but not the heat storage function. A generally accepted definition of a "solar window" or "solar transmittor" is a member (planar or curvilinear) which transmits solar energy radiation (0.3 to 2.5 micron wavelength) and in addition provides some degree of heat insulation, where the heat transfer loss would consist of heat energy radiation (about 4.0 to 30.0 micron wave length), conduction and/or convection. Thus, an open hole is not a solar window or transmittor by this definition because it does not afford any insulating qualities.

Similarly, the absorbing function is generally defined as the conversion of solar radiation energy to heat energy. The dark or black portion of tubes 18, hereinbefore referred to, serves this absorbing function. To some extent, the water itself can also do this provided the front of the tube is transparent. Thus, it should not be apparent that this invention discloses a unique feature whereby the tube members 18 function as a part of the traditional "collector" structure and also function as the absorber and storage structure.

It should be noted that the parallel tubes 18 may be filled with a variety of materials other than water, as for example, paraffin, asphaltic compounds, eutectic salts, or granular solids such as rocks. In fact, most any material would serve the purpose so long as it possesses the characteristics of being able to absorb heat, store this heat, and then release this heat when the ambient air temperature around the tube is lower than the temperature of the exterior tube surface.

In the illustrated embodiment, a segment of the translucent tube surface is colored black along its length in order that this portion may act as a heat absorber. When placed into position, tubes 18 should be oriented so that the black portion is generally perpendicular to the plane of the solar rays passing through the transmittor panel 11. Though the illustrated embodiment discloses the transmittor panel 11 as being planar, it may desirably be configured in a convex curvilinear shape Notwithstanding which shape the transmittor panel takes, whether planar or curvilinear the tubes 18 should be positioned relatively close to the solar window and to each other.

The tubes 18 may be oriented so that the black sectors or portions are at the rear of the tube; i.e. furthest away from the interior of transmittor panel 11 as shown in FIG. 1, or alternatively, the tubes may be oriented so that the black sectors are at the front of the tube; i.e. closest to the interior of panel 11.

If the tube is oriented with the black sector at the rear, solar energy will pass through the translucent portion of the tube then in part be absorbed by the water and the remaining solar energy will pass through the water and strike the black sector 9 which then becomes heated and conducts this heat into the water. If the tube is oriented with the black sector at the front, that is, immediately adjacent the interior of transmittor panel 11, the solar rays will heat that portion directly, and thus conduct the heat into the water. Accordingly, in either orientation, the water within the tubes becomes heated.

In the event tubes 18 contain rock or other granular material whose physical state does not change with temperature, it is preferable that the surfaces of such granular material be of a dark, heat absorbing color and the tubes be of energy transparent construction. If such coloring of the granular surface does not occur naturally, then a suitable black paint or other black coloring may be applied in order to enhance the heat absorbing qualities of such material. It should also be noted that where a granular type of absorber material is employed within tubes 18, suitable perforations at the bottom and top of each tube are necessary in order to extract the heat from within the tube. Tubes 18 should in all cases preferably be enclosed at their tops.

Referring again to FIG. 1, in operation, solar rays pass through the solar window or transmittor panel 11 and interact with the black sector of tube 18 as hereinbefore described. In this heating mode, the heat storing material within tube 18 (water, paraffin, etc.) will have its temperature raised so long as a thermal gradient is present whereby the temperature of the black sector of tube 18 is maintained at a higher level than the temperature of the material absorbing the heat conducted to it from the black portion.

In the case of employing a granular or other internal absorber material, tube members 18 are left entirely energy transparent, this is, with no black sector thereon since the darkened granular or other suface itself behaves as the principal energy absorber.

When the solar rays get out of position or out of range and no longer provide sufficient energy input to the black tube portion in order to maintain the required heat flow into the absorbing material, the solar window or transmittor panel should have its energy transparent characteristic changed to that of being energy opaque. This will prevent any out-migration of heat from within chamber 17 through the transmittor panel.

Figure 2:
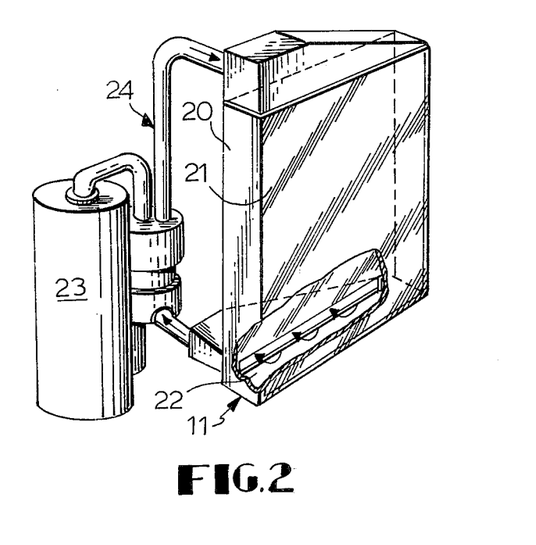
FIG. 2 is a perspective schematic view of one embodiment of a typical transmittor panel with apparatus operatively connected thereto for selectively making the panel "super-insulated"
Figures 3, 4:
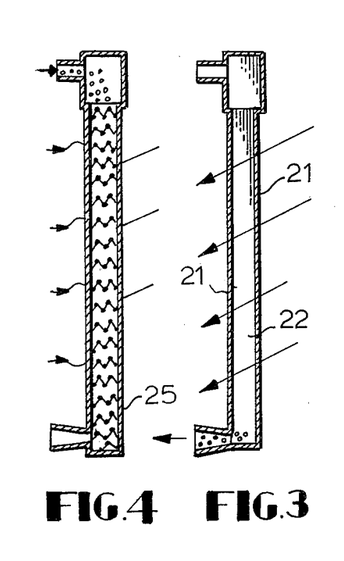
FIG. 3 is a vertical cross-sectional view of the panel shown in FIG. 2 in the condition of being energy transparent.
FIG. 4 is a vertical cross-sectional view of the panel shown in FIG. 2 filled with blown-in insulating material thus in the condition of being "super-insulated" and energy opaque.

This may be accomplished in a variety of ways. For example, referring to FIGS. 2, 3, and 4, there is schematically illustrated a typical solar window and transmittor panel 11 comprised of a rigid rectangular frame 20 with glass fiber reinforced polyester facing sheets 21 laminated in opposed relation to each surface thereof. This construction provides a hollow cell 22 between the facing sheets 12. A suitable conduit system 24 connects cells 22 with a container 23 of granular insulation 25 such as polystyrene pellets or the like. A conventional blower, schematically shown, operatively connected to conduit 24 is employed to blow the insulation 25 from container 23 into cell 22 filling the entire cavity. This insulates solar window 11, i.e., gives it characteristics of being energy opaque and thus for all practical purposes prevents any heat transfer from within chamber 17. When desired, the blower action is reversed and insulating pellets 25 are withdrawn from cell 22 and returned to container 23. By employing this selective transfer of insulation, solar window 11 may be made energy transparent, i.e. translucent or energy opaque, i.e. heat insulating, at will.

Figure 5:
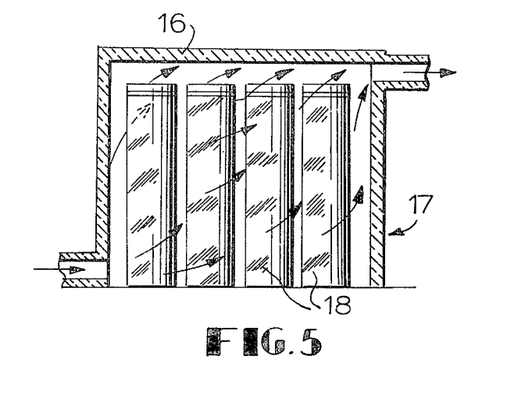
FIG. 5 is a schematic view of the solar invention typically connected to hot-air type heat circulating ducts.

It should be obvious in light of the foregoing disclosure that once material within tube 18 has absorbed sufficient heat, and the solar window 11 is selectively filled with insulation, the air within chamber 17 becomes heated by convection from the tubes. In order to utilize this heat, suitable connections can be made whereby chamber 17 is connected to a conventional hot air ducting system as schematically illustrated in FIG. 5. A typical fan and other related "hot-air" system will circulate the ducted air through chamber 17. In such an arrangement, the cold air return should be located at the bottom of chamber 17 as illustrated and the hot-air outlet should be located at the top, as shown. Tubes 18 with their abundance of absorbed heat are now at this point in the heat extraction phase and become a heat source which heats the air being circulated through chamber 17.

It is also apparent in light of this disclosure that chamber 17 need not necessarily be connected to an air distribution system at all. An alternate to this may be "thermal-siphoning" arrangement where large venting ports are built in to the interior wall portions of chamber 17 at the top and bottom. Though the rate of heat extraction would be less rapid than that of a blower system, it would have the advantage of not requiring any electrical inputs and would therefore most logically employ manually controlled vents.

Figure 6:
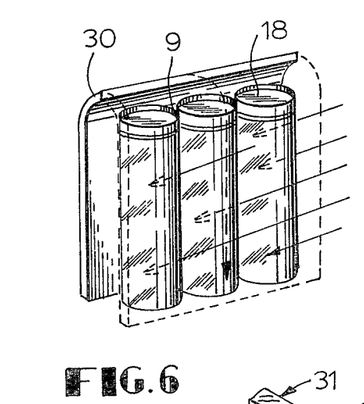
FIG. 6 shows an embodiment whereby a flexible insulating curtain may be selectively positioned from the rear to the front of the array of solar energy absorbers.
Figure 7:
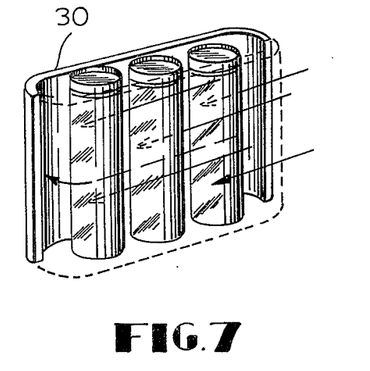
FIG. 7 shows an alternate embodiment of how the flexible insulating curtain can be positioned around the array of solar energy absorbers.

Alternate embodiments of insulating transmittor panel 11 comprise the use of an extensible insulating drape 30 adapted to operate on a conventional pair of tracks schematically illustrated in FIGS. 6 and 7. In embodiment the insulating drape may replace the rigid insulating reflective wall portion 13 in chamber 17. Thus, when the solar device is operating in its energy absorbing mode, the extensible insulating drape is raised in the front permitting solar rays to act on tubes 18. When the heat absorbing mode is concluded, the drape is simply traversed to the front, thus thermally insulating transmittor panel 11 and effectively minimizing any heat loss from the chamber. If desired, the rear drape 30 may be so arranged as to uncover ports in chamber 17 thus permitting heated tubes 18 to convect their heat directly into the adjacent room area.

The embodiment shown in FIG. 7 illustrates how curtain 30 may be adapted to traverse in a horizontal rather than a vertical plane. It should now become apparent that a variety of combinations are possible by employing the concept of the insulating curtain with the basic invention.

Figure 8:
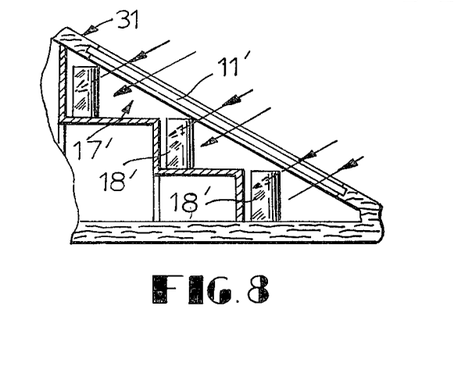
FIG. 8 schematically depicts a typical orientation of how this invention may be employed for roof installations to collect and store solar energy.

The arrangement of parts of FIG. 8 illustrates a typical roof or attic installation of this invention. As shown in transverse section, tubes 18' are placed in a stepped orientation under a roof portion 31 which comprises a sloping solar transmittor 11' as hereinbefore described. Obviously the means hereinbefore described may be used for insulating this arrangement of transmittor structure. The various described modes of heat extraction, could also be employed to withdraw the heat from within insulated roof chamber 17'.

Chambers 17' because of their highly insulated nature may be employed as a repository for any waste heat generated in a building and stored therein until needed. For example, in domestic applications, the exhaust heat from clothes dryers may be piped directly into this chamber and thus stored for subsequent use.

In the preferred attic version of FIGS. 9 through 12, the tubes 18' of FIG. 8 are shown disposed along the length of the attic relatively close to the insulation walls 12, 13 (as in FIG. 1) that form the important insulated chambers space of heat control "cocoon" 17'. As in the case of the embodiment of FIG. 8, the attic system of FIGS. 9–12 combines the normally wasted hot attic space of a house with proven passive solar system design fundamentals into a unique, low cost, roof-integrated, controllable-hybrid passive solar system (i.e. with simple means for powered or controlled air-flow heat extraction from storage and heat distribution) for space heating and, also, year-round domestic hot water preheating. Such a controllable passive system achieves the controllability offered by active systems and the simplicity, reliability and reduced incremental costs of passive systems.

Thus, as in the other embodiments, solar energy is admitted through the sloping roof transmittor glazing 11' and is collected and stored in situ in the vertical water-filled and sealed tubes 18'. The glazing 11' may slope at an acute angle of, say, 30 degrees, more or less, depending upon location. When heat is required, very low powered fans (cool air return fan 40 in return inlet 41, to the right in FIG. 11, and hot air delivery fan 42 in hot air outlet 43 to the upper left) direct air over the heat source or heat-exhange external surfaces of the tubes 18' in a horizontal path, and distribute the heated air to the space to be heated. The fan distribution motors 40 and 42 may be fractional horsepower, window-type fans, which are controlled manually or by simple thermostats, to bring cool return air from the heated room into the attic where it is directed over the storage tube surface 18', which now act as heat exchangers. The cool air moving over the tubes extracts the stored heat from the water therein, and the heated air is distributed by the fans to the spaces requiring heat.

Further in accordance with the invention, year-round domestic hot water preheating (DHW) may also be accomplished by adding two or more pressurized black-painted water storage tanks 33 in the attic at the base of the vertical solar storage tubes 18' of FIGS. 9–12, and between the conventional hot water heater inlet 34 and the hot water supply outlet 35. The water in the tanks 33 is heated by a combination of direct solar radiation, radiation from the heated tubes 18', and convection from the hot air trapped in the attic.

Figure 9:
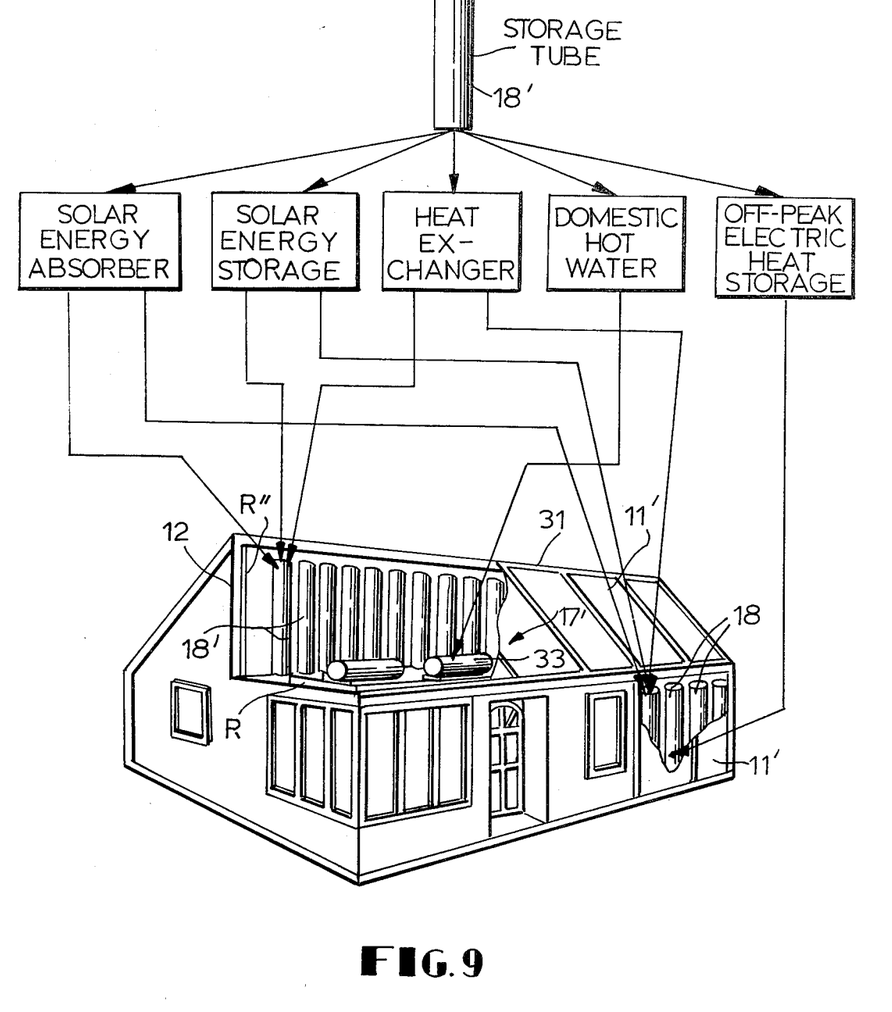
FIG. 9 is a view of a preferred or best mode embodiment of the invention employed in the attic setting of FIG. 8, and cooperating with a domestic hot water supply and a supplemental lower floor wall furnace of similar construction.
Figure 10:
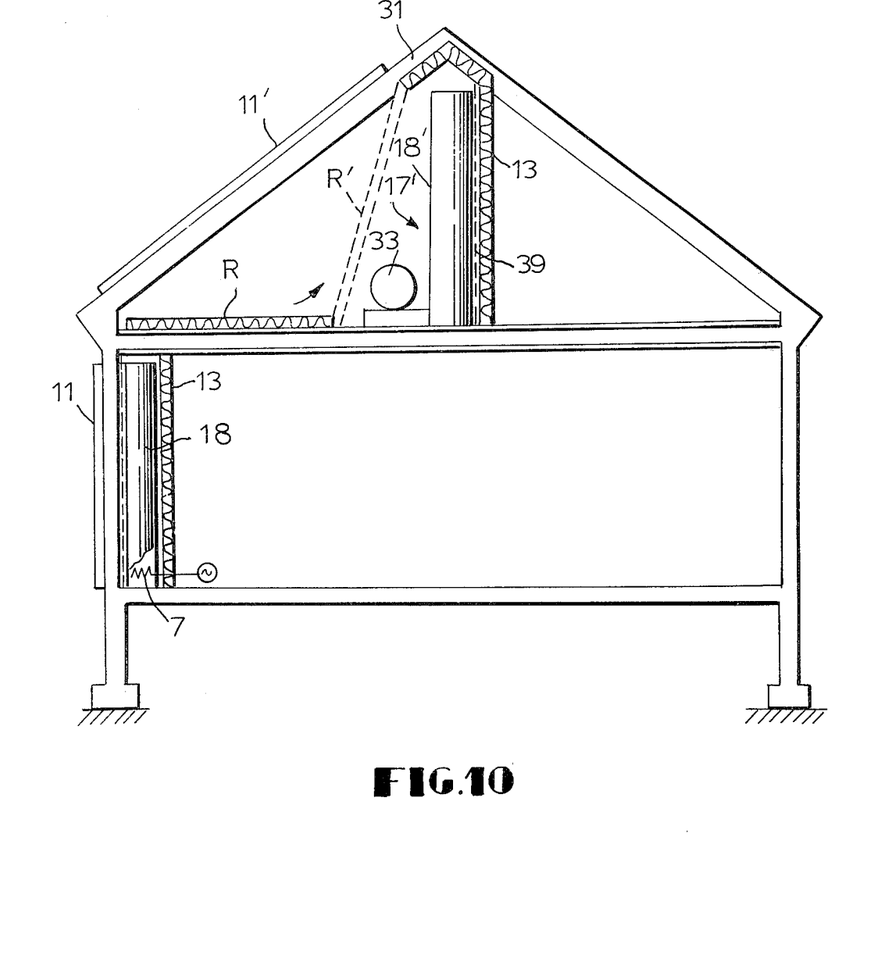
FIG. 10 is a transverse section of FIG. 9 illustrating an easterly elevation of the same.
Figure 11:
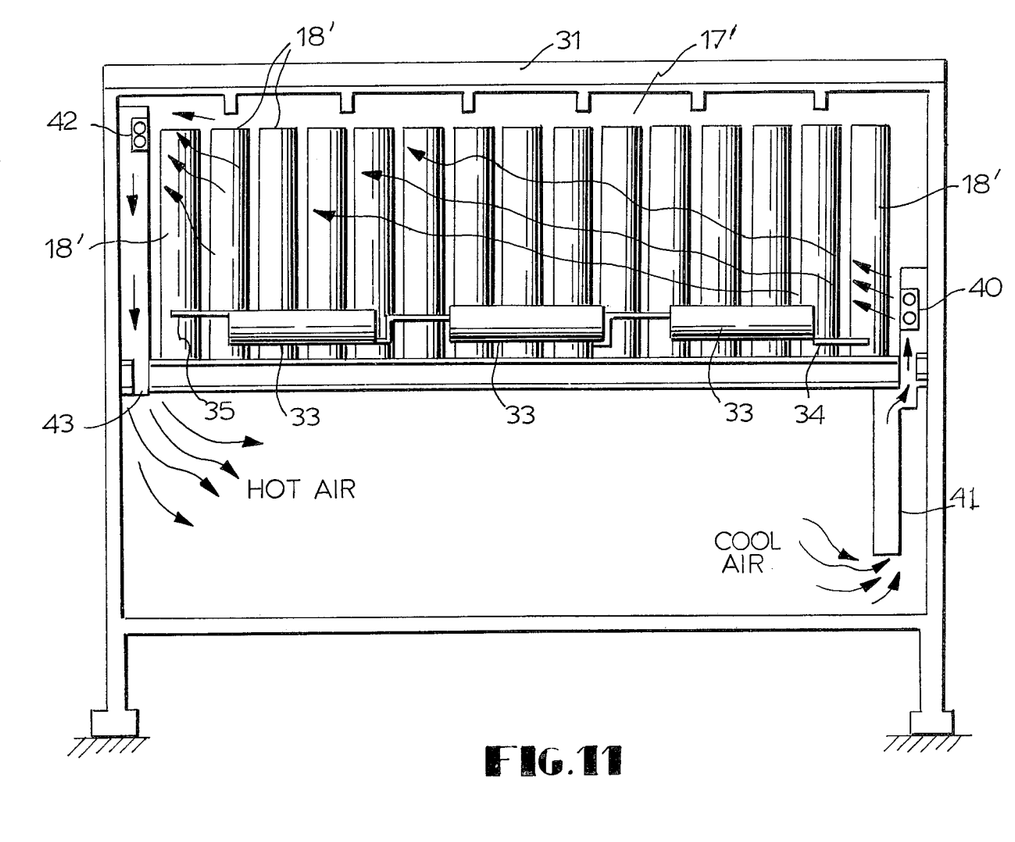
FIG. 11 is a southerly, elevational view of the attic system of FIG. 9.

A system of fixed and movable insulated reflectors, the latter located on the floor at R and the former at the gable ends of the attic R", may also be employed as in FIGS. 9 and 10 to augment winter solar heat gain, reduce storage losses at night or on cloudy days, provide an air flow passage for controlled heat extraction, and reject excess summer heat.

This solar attic concept utilizes the otherwise wasted space in the structure with a system that has little impact upon the architectural features of the rest of the building. In addition, this integrated roof system costs less to build because the glazing 11' functions as the roof surface as well as the cover for the solar collector. Such solar roof facing glazing 11' as the Kalwall Sun-Lite$^R$ Solar Roofing—lightweight aluminum and fiberglass sandwich roofing panels—has excellent solar energy transmission (77%) and an insulating U-value of 0.46 BTU/hr. ft.$^{2\circ}$ F. The flow of energy passing therethrough next follows one of two paths. The first path is directly to the row of water-filled heat storage tubes 18' located below the roof ridge line. Water offers the best heat storage capacity of common substances, having five times the heat storage capacity per unit mass of concrete or stone, reducing drastically the structural requirements for storing an adequate amount of heat in the attic space. The non-corrosive low pressure fiberglass tubes 18', covered with an absorbing coating which converts the sun's energy to heat, as before described, serve simultaneously as the absorber and storage elements in the system. This is a proven passive "water-wall" which requires no external power or fluid movement for collection and storage of the sun's energy. The tubes 18' hold this heat for immediate use or store it for future use at night or on overcast days.

Figure 12:
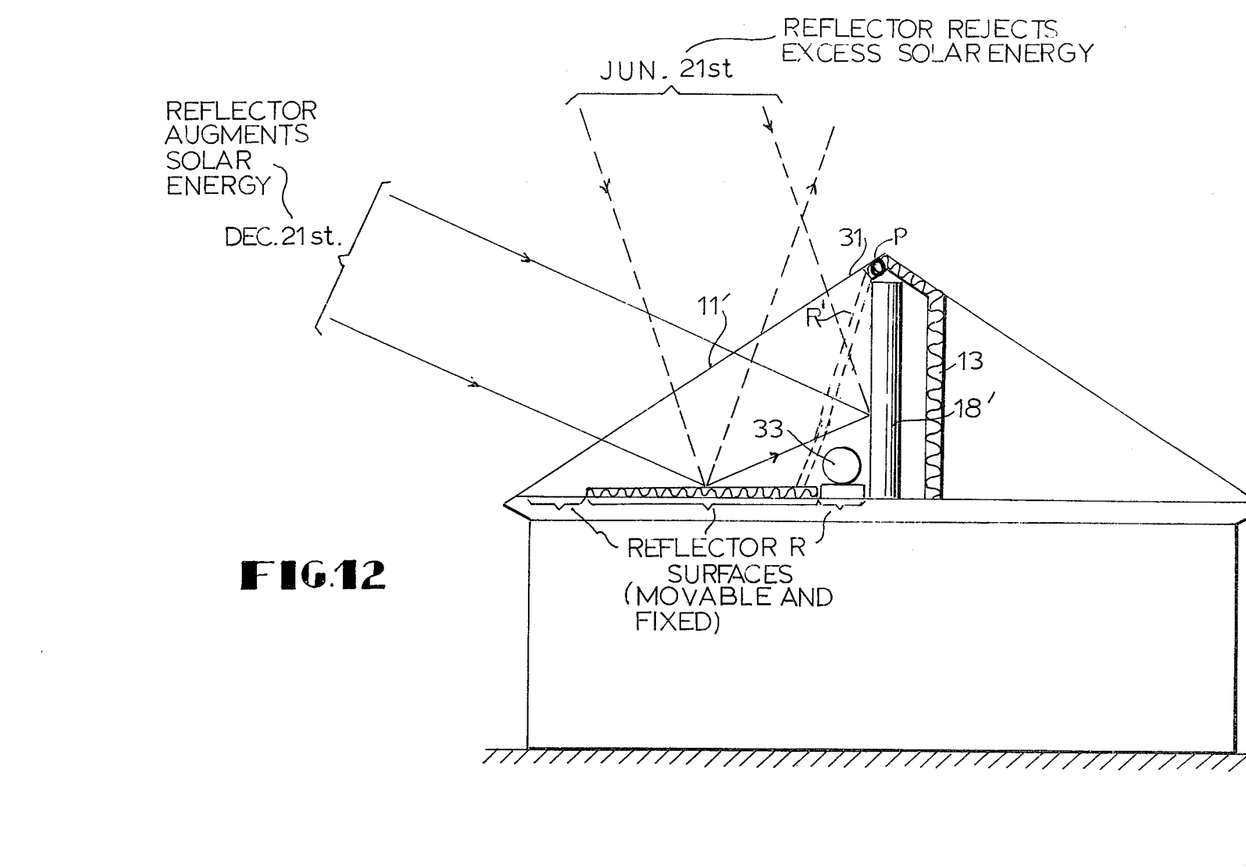
FIG. 12 is a view similar to FIG. 10, illustrating different reflector positions.

The second possible path is for the energy to strike the mirror-like reflector R located on the floor of the attic in front of the tubes 18', FIGS. 10 and 12. This reflector R serves several purposes. First, it augments the solar gain of the storage tubes 18' in the winter by reflecting solar energy to the tubes that would not strike them otherwise, as shown by the lower ray in FIG. 12. As the sun's altitude angle becomes greater in the spring and summer, (as illustrated by the dash-line rays) the reflector reflects increasingly greater amounts of unneeded solar energy from the attic. This automatically prevents excessive heat buildup in the attic during those months when little or no space heating is required.

In accordance with a preferred embodiment of the invention, the reflector R is preferably made movable and insulated, and provides a means of reducing heat losses from storage at night to a minimum, as will now be explained, and with the entire reflector assembly permanently protected inside the attic from the effects of wind and weather. The reflector R, which may be segmented if desired, may be moved manually or automatically using a simple torque-motor and pulley arrangement P, FIGS. 10 and 12 or a winch and pulley chain and sprocket drive or the like, from the floor where it is horizontal or near-horizontal, into a near vertical position R' in front of the tubes 18', gasket-sealed around its perimeter to prevent infiltration heat loss. This creates a closed air channel through which the distributed air is forced at higher velocities over the tubes 18', thereby increasing heat transfer and overall system efficiency. The rear of the air channel is formed by the highly insulated, vertical partition 13 (similar to that of FIG. 1) on the north side of the tubes 18'. This partition 13 also prevents heat loss from storage to the unheated northern portion of the attic, and a supplemental infra-red heat transfer baffle 39 may also be interposed as shown in FIG. 10.

The above-described distribution system may operate in two modes. During the day when sufficient heat is available, the before-mentioned fans direct the cool room return air across the heated tubes in a horizontal pattern extracting heat from the tubes and distributing the heated air to the space requiring heat. At night or on overcast days, on the other hand, the movable section of the reflective floor R immediately in front of the tubes, is raised into position creating an insulated channel through which the distribution air flows. When there is no air flow, this insulated section creates a "thermos-bottle" effect, cutting down the heat loss to the outside air.

Returning, now, to the previously described further feature of the domestic hot water preheating system, the uninsulated pressure tanks 33 filled with water are shown located at the base of the tubes 18' and are behind the insulated reflector when in its raised position R', as more particularly shown in FIG. 10. The tanks 33 may also be vertically oriented, as between the tubes 18' and might also be disposed horizontally above the tubes 18' within the insulation cocoon. The water in the tanks 33 is heated during the day by direct radiation from the sun and by convection from the hot air in the attic. The tanks will never freeze under normal operating conditions because of the thermal mass of the nearby storage tubes 18' and the tanks themselves, allowing year-round operation. The tanks are simply plumbed in series to the inlet side of the conventional hot water tank, between the inlet and the water supply. No additional pumps or valves are required because the pressure of the water supply is sufficient to operate the system.

The attic may also be equipped with an infiltration proof exhaust fan system, not shown, for those infrequent times of the year when additional attic venting is required.

As before explained, the attic embodiment of the invention may also be supplemented by a side wall solar furnace, such as that of FIG. 1, as is also illustrated in FIGS. 9 and 10 on the lower floor. Only a small part of such wall will be required for direct supplemental heating of the downstairs room, the installation comprising vertical glazing transmittor wall 11, a small number of vertical storage tubes 18 within the chamber that is insulated at 13, and, an off-peak electrical heater boosting element 7. This concept thus enables a minimum area of south wall to be required for solar heating and puts the principal solar installation in the least valuable attic space.

Figure 13:
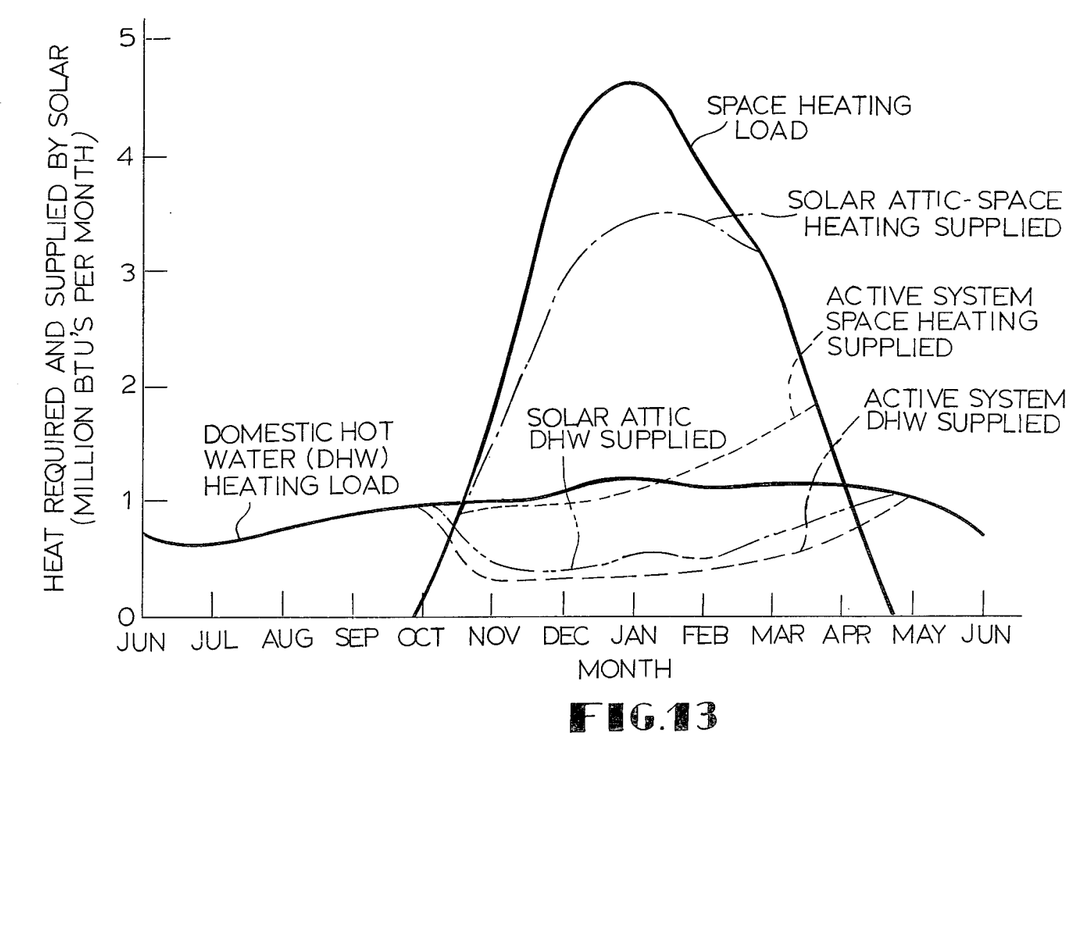
FIG. 13 is a graph demonstrating the performance efficacy of the invention.

The performance graph of FIG. 13, plotting months along the abscissa and required and supplied heat (in the New England area) along the ordinate in units of millions of BTU's per month, demonstrates the remarkable efficacy of the invention and it superiority over conventional active air solar systems previously discussed. For purposes of comparison, the best state-of-the-art active system embodying roof-mounted hot air collectors with remote rock bed storage and separate heat exchange coil, storage tank, circulating pump and plumbing for supplying domestic hot water (DHW), was selected. The required heating load ("Space Heating Load") is very substantially approximated in the October to April period by the system of FIG. 9 ("Solar Attic-Space Heating Supplied"), as compared with the previous active systems of equal cost ("Active System Space Heating Supplied"). These performance curves clearly show that the solar attic system of the invention supplies substantially more of the building's space heating load than do equal cost active systems. The "Solar Attic DHW Supplied" feature does somewhat better than active systems ("Active System DHW Supplied") in fulfilling part of the total "Domestic Hot Water (DHW) Heating Load" in the fall, winter and early spring months. The improved performance of the invention results from the multiple use of the system components for several functions and the synergistic effect of utilization with the hot water system within the insulated cocoon. This comparison was based on a residential application having 5621 heating degree-days per year, a floor area of 1600 square feet, a building heat loss of 5400 BTU/degree-day, and a domestic hot water requirement of 55 gallons/day. The solar attic system of FIG. 9 embodied 934 square feet of solar roof glazing 11' and 96 square feet of south wall glazing 11 (18% of the south wall area).

The performance superiority of the invention resides, in summary, in the following features:

1. Conventional present-day active systems are considerably more expensive per square foot of collector.

2. The conventional systems require the use of two independent systems; one for space heating and one for domestic hot water heating.

3. The active system is mounted on the roof, requiring expensive mounting hardware. The system of the invention utilizes roof and wall glazing panels which form an integral part of the building envelope, allowing a substantial cost deduction for the roof and wall areas they replace.

4. The conventional system requires extensive piping and duct-work, resulting in duct and pipe heat losses and in the use of large expensive electric blowers to overcome duct pressure losses.

5. The system of the invention achieves cost-effectiveness by making multiple use of major system components such as:

Solar Glazing (collector glazing, roof surface, weatherwall)

Storage Tubes (absorber surfaces, heat storage for space heating, heat storage for domestic hot water heating, storage for off-peak electric heat, and heat exchange surfaces)

Shutter (movable reflector, heat storage insulated "cocoon" chamber).

6. The above performance comparison is made on a "first-cost" or initial cost basis. In addition to the system of the invention, with its low power air fans using substantially less electricity than the state-of-the-art active system, the invention employs considerably fewer moving parts, and therefore has substantially reduced maintenance and repair costs, compared to active systems.

While the invention has been described in connection with preferred constructional elements, clearly variations can be made.

It should be further noted that in industrial and commercial buildings, large cement columns, if suitably encased within an insulated chamber with a solar window, may represent a viable substitute for tubes 18 filled with heat absorbing material.

Though the tube orientations have been disclosed being substantially vertical, moreover, it is to be understood that various positions including horizontal are also envisioned within the scope of this invention.

Various other modifications are contemplated and may obviously be resorted to by those skilled in the art without departing from the spirit and scope of this invention as defined by the appended claims.

The term "outer wall" as used in the claims in reference to the solar transmittor panel is intended to cover vertical building structures such as wall 10 in FIG. 1 of the drawings, and also to cover roof portions, such as the sloping roof portion 31 shown, for example, in FIG. 10 of the drawings.

What is claimed is:

1. In combination with a building, an integrated low temperature, solar space and water-heating system comprising an insulated enclosure operatively associated with the building, at least one side of said enclosure comprising a solar transmittor panel forming a part of an outer wall of the building, said enclosure extending into the building a distance substantially in excess of the thickness of said outer wall, a heat sink within said enclosure spaced inwardly from the transmittor panel for receiving and absorbing solar energy through said panel and simultaneously storing the heat of said energy therein and thereat, said heat sink comprising at least one container with heat absorbing material therein, the heat absorbing material occupying a significant volume of the enclosure, means including powered air moving means connected to said enclosure for circulating air through another part of the building and through said enclosure in heat transfer relation with said heat sink, at least one water tank in said enclosure in radiant heat-receiving relation with said heat sink, said water tank forming part of a hot water supply system for the building, both said heat sink and said water tank being positioned in the enclosure for direct exposure to solar energy received through said transmittor panel, and movable insulating means within the enclosure, the insulating means being movable between a first position exposing the heat sink and water tank to heat energy transmitted through said transmittor panel and a second position screening the heat sink and water tank and minimizing heat transfer between the enclosure and the outer environment through said transmittor panel.

2. A combination as defined in claim 1, wherein said container is spaced inwardly from a lower end of the transmittor panel a distance comparable to the height of the panel.

3. A combination as defined in claim 1, wherein the water tank is positioned between the container and the transmittor panel.

4. A combination as defined in claim 1 or claim 3, wherein the container is cylindrical with a vertical axis and the water tank is cylindrical with a horizontal axis.

5. A combination as defined in claim 1, wherein the insulating means comprises a screen which in said first position is disposed substantially horizontally between the transmittor panel on the one hand and the container and water tank on the other hand and the system includes means for elevating the screen from the first position into the second position.

6. A combination as defined in claim 5, wherein the screen in said second position forms an airflow passage surrounding the heat sink, which passage is of substantially reduced cross-section relative to the cross-section of the enclosure.

7. A combination as defined in claim 1, wherein the screen has a reflective surface which, in the first position of the screen is adapted to reflect solar heat energy received through said transmittor panel toward the heat sink or outwardly through said panel dependent on the position of the sun.

8. A combination as defined in claim 7, wherein both surfaces of the screen are reflective surfaces.

9. A combination as defined in claim 1, wherein said enclosure is formed in an attic space of the building and said transmittor panel forms part of the roof of the building.

10. A combination as defined in claim 9, wherein the roof is a sloping roof.

11. A combination as defined in claim 9, including further solar space-heating means in a side-wall insulated enclosure associated with the building and having a substantially vertical transmittor panel.

12. A combination as defined in claim 1, wherein said container is a translucent tube.

13. A combination as defined in claim 12, wherein a portion of the tube is colored black.

14. A combination as defined in claim 1, wherein the transmittor panel is a multiple-layer glazed panel formed of translucent sheet materials in opposed spaced apart relation forming at least one interior cell therebetween.

15. A combination as defined in claim 1, wherein the heat sink comprises a plurality of vertically disposed tubes and the heat-absorbing material comprises fluid in said tubes.

* * * * *